Nov. 21, 1933.    A. F. T. HARROWER    1,936,391

THAWING APPLIANCE

Filed Feb. 19, 1931

INVENTOR
Archibald Frederick Thompson Harrower his Attorney

Patented Nov. 21, 1933

1,936,391

UNITED STATES PATENT OFFICE 1,936,391

THAWING APPLIANCE

Archibald Frederick Thompson Harrower, Quebec, Quebec, Canada

Application February 19, 1931, Serial No. 516,992, and in Canada February 19, 1930

1 Claim. (Cl. 219—19)

This present invention relates to certain new and useful improvements in a thawing appliance.

The primary object of the invention resides in the provision of a thawing appliance particularly designed for thawing pipes and the like.

The invention has for another object the provision of a thawing appliance of the character stated which is of extremely simple and inexpensive construction and operation and employs an electric current for heating and thus thawing the pipes.

The invention has for a further object the provision of a thawing appliance of the character stated which is not only of simple and inexpensive construction and operation and increased efficiency but may be readily connected with an electric globe socket or the like and extended around the pipe to be heated and thawed.

The invention has for a still further object the provision of a thawing appliance of the character stated which is composed of the minimum number of parts of simple and inexpensive construction, may be manufactured at small cost and may be retailed at a popular price with a good profit, thus providing a commercially attractive proposition.

To the accomplishment of these and related objects as shall become apparent as the description proceeds, my invention resides in the construction, combination and arrangement of parts as shall be hereinafter more fully described, illustrated in the accompanying drawing and pointed out in the claim hereunto appended.

The invention will be best understood and can be more clearly described when reference is had to the drawing forming a part of this disclosure wherein like characters indicate like parts throughout the several views.

In the drawing:—

Figure 1:
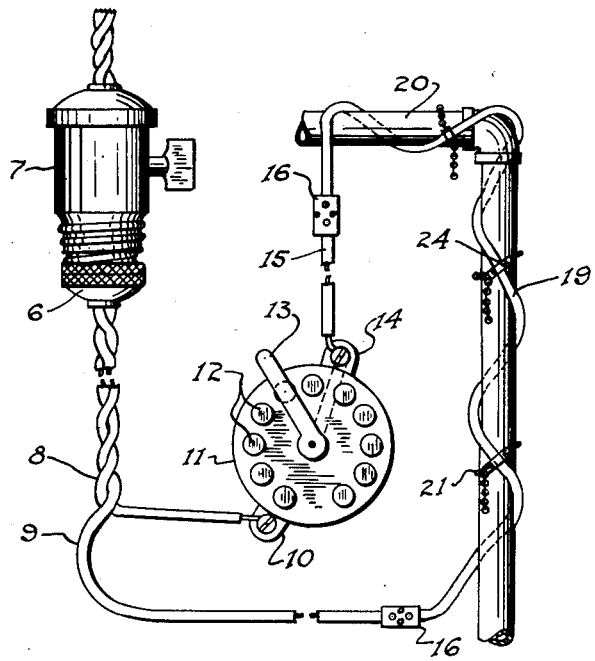
Figure 1 is an elevation of the complete thawing appliance, showing the same in a diagrammatic manner ready for use.
Figure 2:
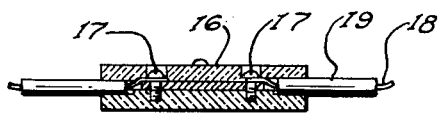
Figure 2 is a detailed view of one of the wire couplings employed in part of the thawing appliance, showing the coupling in section.
Figure 3:
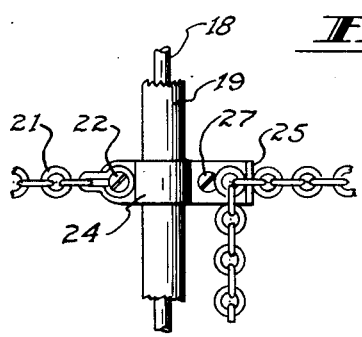
Figure 3 is a detailed plan of a portion of the device, showing the form of the clamps employed for maintaining the heating element of the appliance in position on the pipe to be heated and thawed.
Figure 4:
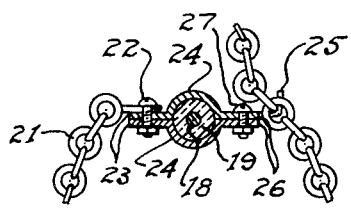
Figure 4 is a detailed transverse section through one of the clamps and the parts associated therewith.

Referring more in detail to the drawing, it is to be noted that the thawing appliance includes a conventional screw plug 6 or the like for removable engagement in the conventional electric bulb socket 7. The wires 8 and 9 extend from the plug 6 and the wire 8 is connected at one terminal 10 of a choke coil 11, rheostat or the like having a plurality of contacts 12 over which the movable member 13 is adapted to be passed, as desired. The movable member 13 connects with the other or remaining terminal 14 of the choke coil, rheostat or the like 11 and a wire 15 is connected with the terminal 14, whereby the strength of the electric current supplied to the wire 15 may be readily altered by proper movement or adjustment of the movable member 13 over the contacts 12 of the choke coil, rheostat or the like 11. A pair of couplings or wire connectors 16 are employed with binding posts 17 adjacent their opposite ends, the bodies or main portions of the couplings or wire connectors 16 being formed on appropriate insulating material. The wires 9 and 15 are each strapped or otherwise removably engaged with a binding post 17 in one end of one of the couplings or wire connectors 16. The remaining binding post 17 in each of the couplings or wire connectors 16 serve to similarly receive the ends of the heating element 18 of the appliance and which heating element is preferably in the form of a section of chrome resistance wires covered with an insulation 19 of asbestos or the like.

This heating element 18 is wrapped around a frozen pipe 20 and held in engagement therewith by the pipe encircling chains 21, each of which has one end mounted on a bolt 22 or the like extended through parallel radial flanges 23 of a pair opposed arcuate clamping members 24 engaged around the heating element 18. After being passed around the pipe 20, each chain 21 has a link adjacent its opposite end locked in the angularly extended and bifurcated chain holding member 25 formed with one of a second pair of radial flanges 26 extended from diametrically opposite portions of the opposed arcuate clamps 24 and held together by a bolt 27 or the like. Thus, each chain 21 may be readily passed around and locked on the pipe 20 or released, as desired.

As the construction of the device has thus been described in detail brief reference is now had to its use and mode of operation: This thawing appliance may be readily connected with an electric bulb socket 7 or the like to receive an electric current through the choke coil, rheostat or the like 11 and through the chrome resistance wire 18 or other heating or thawing element of the appliance. This heating element 18 may be readily secured around or removed from a frozen pipe 20, as required and the pairs of opposed arcuate clamps 24 may be kept on the heating element 18 with the chains 21 permanently connected with the pairs of opposed arcuate clamps 24. Furthermore, the ends of the heating element 18 as well as the wires 9 and 15 may be readily connected with or disconnected from the binding posts 17 of the couplings or wire connectors 16. When the heating element 18 is secured around the frozen pipe 20 and the current of proper intensity passed therethrough by proper manipulation of the choke coil, rheostat or the like 11, the pipe will be quickly thawed and thus restored to normal condition.

From the foregoing description taken in connection with the accompanying drawing, it will be manifest that a thawing appliance is provided that will fulfill all the necessary requirements of such a device but as many changes could be made in the above description and many apparently widely different embodiments of my invention may be constructed within the scope of the appended claim without departing from the spirit or scope thereof, it is intended that all matters contained in the said accompanying specification and drawing shall be interpreted as illustrative and not in a limited sense.

Having thus described my invention, what I claim as new and desire to secure by Letters Patent is:—

A thawing appliance including a flexible heating element for engagement around a pipe; a pair of clamping plates having arcuate central portions opposed to one another and encircling said flexible heating element; said clamping plates having pairs of end flange extensions extended in diametrically opposite directions; clamping bolts extended through the parallel corresponding extended end flanges and securing said clamping plates on said flexible heating element; a pipe encircling chain carried by one end on one of said clamping bolts; an angularly directed bifurcated member projecting from one of the end flanges of one of said clamping plates and receiving and locking on one of the links of said chain after the latter is extended around the pipe; and means for connecting said flexible heating element with an electric circuit for supplying electric current to said flexible heating element.

ARCHIBALD FREDERICK THOMPSON HARROWER. [L. S.]